United States Patent  (10) Patent No.: US 9,294,715 B2
Engstrand (45) Date of Patent: Mar. 22, 2016

(54) CONTROLLING DISPLAY OF VIDEO DATA

(71) Applicant: Microsoft Technology Licensing, LLC, Redmond, WA (US)

(72) Inventor: Jakob Olof Engstrand, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 14/191,115

(22) Filed: Feb. 26, 2014

(65) Prior Publication Data
US 2015/0124043 A1 May 7, 2015

(30) Foreign Application Priority Data
Nov. 1, 2013 (GB) .................................. 1319333.9

(51) Int. Cl.
H04N 7/14 (2006.01)
H04W 24/00 (2009.01)
H04L 29/06 (2006.01)

(52) U.S. Cl.
CPC ............ *H04N 7/141* (2013.01); *H04L 65/1059* (2013.01); *H04L 65/1089* (2013.01)

(58) Field of Classification Search
CPC ............... G01S 5/0072; H04L 65/1059; H04L 65/1089; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04W 4/18; H04W 4/185
USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16; 379/265.03; 455/414.1, 566; 704/270
See application file for complete search history.

(56) References Cited

U.S. PATENT DOCUMENTS 7,979,067 B2 7/2011 Nair
8,421,805 B2 4/2013 Bishop
(Continued)

FOREIGN PATENT DOCUMENTS

EP 2015572 1/2009
JP 2002300548 10/2002
(Continued)

OTHER PUBLICATIONS

Flintham, et al., "I Like Frank: A Mixed Reality Game for 3G Phones", In Proceedings: IEEE Computer Graphics and Applications, May 9, 2008, 8 pages.
(Continued)

*Primary Examiner* — Khai N Nguyen
(74) *Attorney, Agent, or Firm* — Danielle Johnston-Holmes; Micky Minhas

(57) ABSTRACT

A user terminal comprising: a network interface; a display; and a communications module configured to: receive video data from at least one further user terminal over a communications network during a communication event with said at least one further user terminal via said network interface; receive location information from said at least one further user terminal over the communications network via said network interface; in response to receiving said location information, display a map on said display, said map displaying a plurality of locations; and for each of said at least one further user terminal, control the video data received from said further user terminal to be displayed on said display to provide a visual indication of the location of said further user terminal at one of said plurality of locations.

19 Claims, 4 Drawing Sheets

(56) References Cited

U.S. PATENT DOCUMENTS

| | | | |
|---|---|---|---|
| 8,423,285 B2* | 4/2013 | Paterson et al. | 701/408 |
| 2006/0199612 A1* | 9/2006 | Beyer et al. | 455/556.2 |
| 2007/0035639 A1* | 2/2007 | Aridome et al. | 348/231.3 |
| 2007/0233367 A1 | 10/2007 | Chen et al. | |
| 2007/0242131 A1* | 10/2007 | Sanz-Pastor et al. | 348/14.02 |
| 2008/0215973 A1 | 9/2008 | Zalewski et al. | |
| 2009/0017870 A1* | 1/2009 | An | 455/565 |
| 2010/0031186 A1* | 2/2010 | Tseng et al. | 715/786 |
| 2010/0228474 A1* | 9/2010 | Paterson et al. | 701/208 |
| 2011/0183732 A1 | 7/2011 | Block et al. | |
| 2013/0130726 A1* | 5/2013 | Deng et al. | 455/457 |

FOREIGN PATENT DOCUMENTS

| | | |
|---|---|---|
| JP | 2005333226 | 12/2005 |
| JP | 2006254414 | 9/2006 |
| KR | 20080085313 | 9/2008 |

OTHER PUBLICATIONS

Purcher, "Location Based Social Networking & Video Calling Coming to iPhone", Retrieved From: <http://www.patentlyapple.com/patently-apple/2010/02/location-based-social-networking-video-calling-coming-to-iphone.html> Aug. 22, 2013, Feb. 4, 2010, 10 Pages.

Yim, et al., "Development of Communication Model for Social Robots based on Mobile Service", In Proceedings: IEEE International Conference on Social Computing / IEEE International Conference on Privacy, Security, Risk and Trust, Aug. 20, 2010, pp. 57-64.

"International Search Report and Written Opinion", Application No. PCT/US2014/062489, Jan. 29, 2015, 10 pages.

"Second Written Opinion", Application No. PCT/US2014/062489, Sep. 28, 2015, 6 pages.

"International Preliminary Report on Patentability Issued in PCT Application No. PCT/US2014/062489", Mailed Date: Jan. 13, 2016, 7 Pages.

* cited by examiner

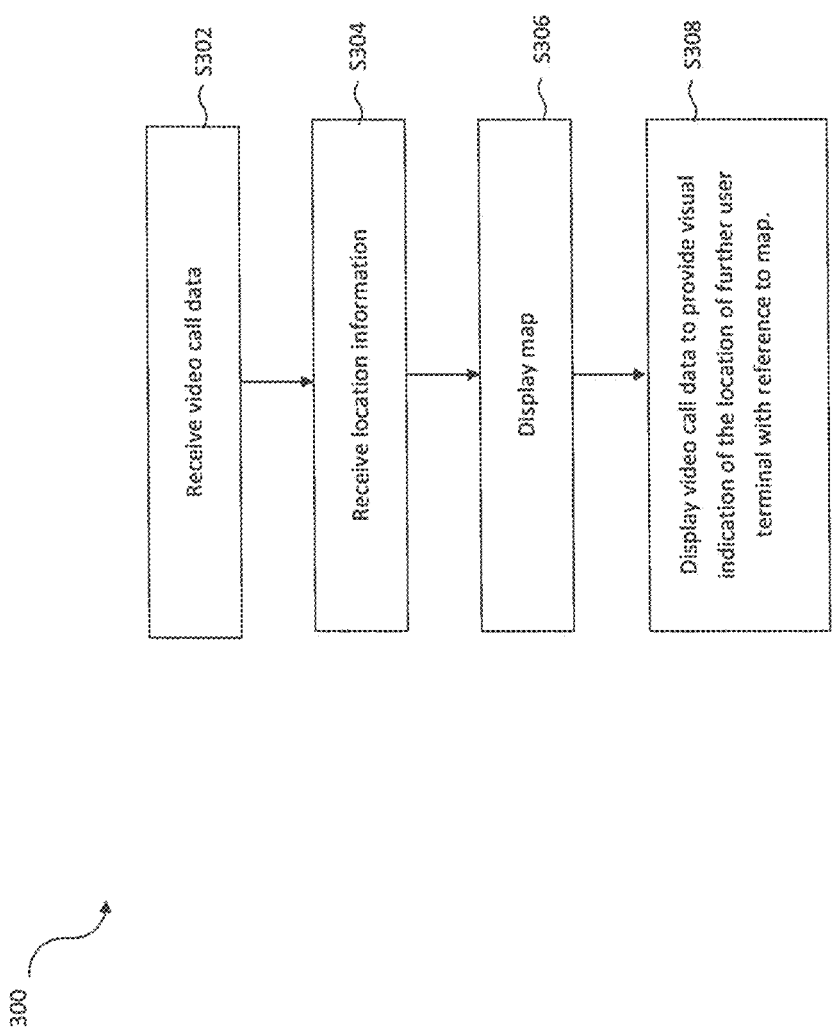

CONTROLLING DISPLAY OF VIDEO DATA

RELATED APPLICATIONS

This application claims priority under 35 USC §119 or §365 to Great Britain Patent Application No. 1319333.9 entitled "Controlling Display of Video Data" filed Nov. 1, 2013 by Engstrand et al., the disclosure of which is incorporate in its entirety.

BACKGROUND

Voice over internet protocol ("VoIP") communication systems allow the user of a device to make calls across a communication network. To use VoIP, the user must install and execute client software on their device. The client software provides the VoIP connections as well as other functions such as registration and authentication. Advantageously, in addition to voice and video communication, the client may also provide video calling and instant messaging ("IM"). With video calling, the callers are able to view video images of the other party in addition to voice information. This enables a much more natural communication between the parties, as facial expressions are also communicated, thereby making video calls more comparable to a face-to-face conversation.

It is often desirable for a participant of a video call to communicate their geographical location to other participants of the video call. This can be implemented in a number of ways.

A first participant of a video call can attempt to verbally describe his location to a second participant of the video call.

It is also common for mobile devices, to comprise location determination functionality to determine the geographic location of the mobile device. This geographic location information can be used by a mapping application executed on the mobile device to display the geographic location of the mobile device to a user of the mobile device.

A first participant of a video call can launch a mapping application on their device. Once launched, the first participant can use the mapping application to display their geographical location. The first participant may then verbally describe their location to the second participant using the displayed geographical location information on the display of the first participant's device. Alternatively, whilst a first participant of a video call is verbally describing his location to a second participant, the second participant can launch a mapping application on their device. The second participant can then attempt to determine the location of the first participant using the verbal description provided by the first participant and the mapping application executed on their device.

SUMMARY

According to one aspect there is provided a user terminal comprising: a network interface; a display; and a communications module configured to: receive video data from at least one further user terminal over a communications network during a communication event with said at least one further user terminal via said network interface; receive location information from the at least one further user terminal over the communications network via the network interface; in response to receiving the location information, display a map on the display, the map displaying a plurality of locations; and for each of the at least one further user terminal, control the video data received from the further user terminal to be displayed on the display to provide a visual indication of the location of the further user terminal at one of said plurality of locations.

According to one aspect there is provided a method implemented at a user terminal, the method comprising: receiving video data from at least one further user terminal over a communications network during a communication event with said at least one further user terminal via a network interface of the user terminal. The communication event may for example be a video call. The method further comprises receiving location information from the at least one further user terminal over the communications network via the network interface. The location information may comprise latitude and longitude information. The method further comprises, in response to receiving the location information, displaying a map on a display of the user terminal the map displaying a plurality of locations, and for each of the at least one further user terminal, controlling the video data received from the further user terminal to be displayed on the display to provide a visual indication of the location of the further user terminal at one of the plurality of locations.

According to another aspect there is provided a computer program product, the computer program product being embodied on a non-transient computer-readable medium and configured so as when executed on a processor of a device to performs the steps of any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the described embodiments and to show how the same may be put into effect, reference will now be made, by way of example, to the following drawings in which:

FIG. 3 is a flow chart for a process of displaying received location information during a video call.

DETAILED DESCRIPTION

Figure 1:
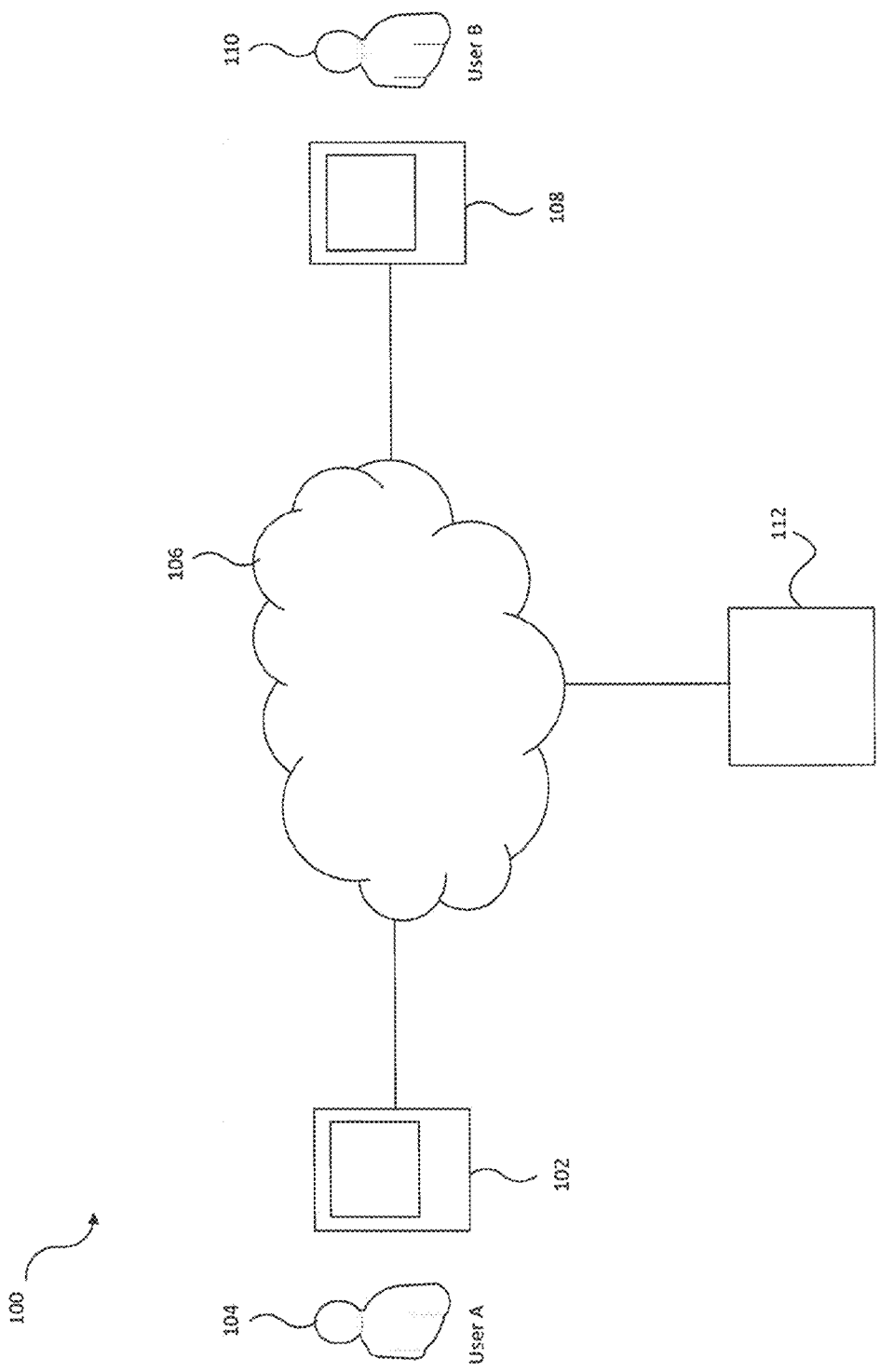
FIG. 1 shows a communication system.

In known implementations, when a participant of a video call communicates their geographical location to a recipient participant of the video call, at any one time the recipient's device displays one type of data output from a single application executed on the recipient device.

For example, referring to the example described above where a first participant of a video call can attempt to verbally describe his location to a second participant of the video call. The second participant's device displays only video data output from a communication client application. It may be difficult for the second participant to accurately determine the location of the first participant, particularly if the first participant's description of his location lacks sufficient information to enable the second participant to determine the location of the first participant. This situation may arise if the first participant is in a geographical location which is unfamiliar to either or both of the first participant and the second participant.

Similarly, when a first participant of a video call launches a mapping application on their device to display their geographical location, and verbally describes their location to the second participant using the displayed geographical location information on the display 204 of the first participant's device. The second participant's device displays only video data output from a communication client application.

Likewise, when a first participant of a video call is verbally describing his location to a second participant, the second participant's device displays video data output from a communication client application. Then if the second participant launches a mapping application on their device to assist them in determining the location of the first participant, the second participant's device stops displaying the video data output from the communication client application and displays geographical location information output from the mapping application. After the second participant closing the mapping application the second participant's device re-commences displaying video data output from the communication client application. At any one time, the second participant's device, displays one type of data output from a single application executed on the second participant's device.

When the first or second participant uses a mapping application during the video call, this is disruptive to the video call as the eye-contact between the first participant and the second participant is interrupted due to a participant having to move from looking into a camera on the participant's device to looking at a display on the participant's device. Furthermore this relies on either the first participant accurately relaying the geographical location information displayed on the display of the first participant's device verbally to the second participant to enable second participant to determine the location of the first participant, or the second participant being able to use the mapping application to determine the location of the first participant based on first participant's verbal describe of their location.

In embodiments of the disclosure, both geographical location information and video data are simultaneously displayed on a user terminal to visually indicate the location of further user terminals from which the location information and video data is received.

Embodiments will now be described by way of example only.

FIG. 1 shows a communication system 100 comprising a first user 104 (User A) who is associated with a first user terminal 102 and a second user 110 (User B) who is associated with a second user terminal 108. Whilst only two users have been shown in FIG. 1 for simplicity, the communication system 100 may comprise any number of users and associated user devices. The user terminals 102 and 108 can communicate over the network 106 in the communication system 100, thereby allowing the users 104 and 110 to communicate with each other over the network 106. The network 106 may be any suitable network which has the ability to provide a communication channel between the first user terminal 102 and the second user terminal 108. For example, the network 106 may be the Internet or another type of network such as a High data rate mobile network, such as a 3$^{rd}$ generation ("3G") mobile network. The user terminal 102 may be, for example, a mobile phone, a personal digital assistant ("PDA"), a personal computer ("PC") (including, for example, Windows™, Mac OS™ and Linux™ PCs), a gaming device or other embedded device able to connect to the network 106. The user terminal 102 is arranged to receive information from and output information to the user 104 of the user terminal 102. In one embodiment the user terminal 102 comprises a display such as a screen and an input device such as a keypad, a touch-screen, and/or a microphone. The user terminal 102 is connected to the network 106. Connected to the network 106 is a mapping server 112 arranged to store map data. The mapping server 112 may be implemented on a single computing device. The mapping server 112 may also operate to support performance of the relevant operations in a "cloud computing" environment whereby at least some of the operations may be performed by a plurality of computing devices.

With increasing mobile bandwidths, there is increasing interest in providing packet-based video calls via client applications running on mobile devices such as Internet-enabled mobile phones. These mobile devices comprise transceivers such as short-range RF transceivers operating on one or more unlicensed bands for accessing the Internet via wireless access points (e.g. of Wi-Fi access points of WLAN networks), and/or cellular transceivers operating on one or more licensed bands for accessing the Internet via a packet-based service of a cellular network such as GPRS (General Packet Radio Service) or HSPA (High Speed Packet Access).

The user terminal 102 executes a communication client, provided by a software provider associated with the communication system 100. The communication client is a software program executed on a local processor in the user terminal 102 (i.e. a communications module). The client performs the processing required at the user terminal 102 in order for the user terminal 102 to transmit and receive data over the communication system 100. As is known in the art, the client executed at the user terminal 102 may be authenticated to communicate over the communication system through the presentation of digital certificates (e.g. to prove that user 104 is a genuine subscriber of the communication system—described in more detail in WO 2005/009019).

The user terminal 108 may correspond to the user terminal 102. The user terminal 108 executes, on a local processor, a communication client which corresponds to the communication client executed at the user terminal 102. The client at the user terminal 108 performs the processing required to allow the user 110 to communicate over the network 106 in the same way that the client at the user terminal 102 performs the processing required to allow the user 104 to communicate over the network 106. The user terminals 102 and 108 are end points in the communication system. FIG. 1 shows only two users (104 and 110) and two user terminals (102 and 108) for clarity, but many more users and user devices may be included in the communication system 100, and may communicate over the communication system 100 using respective communication clients executed on the respective user devices, as is known in the art.

Figure 2:
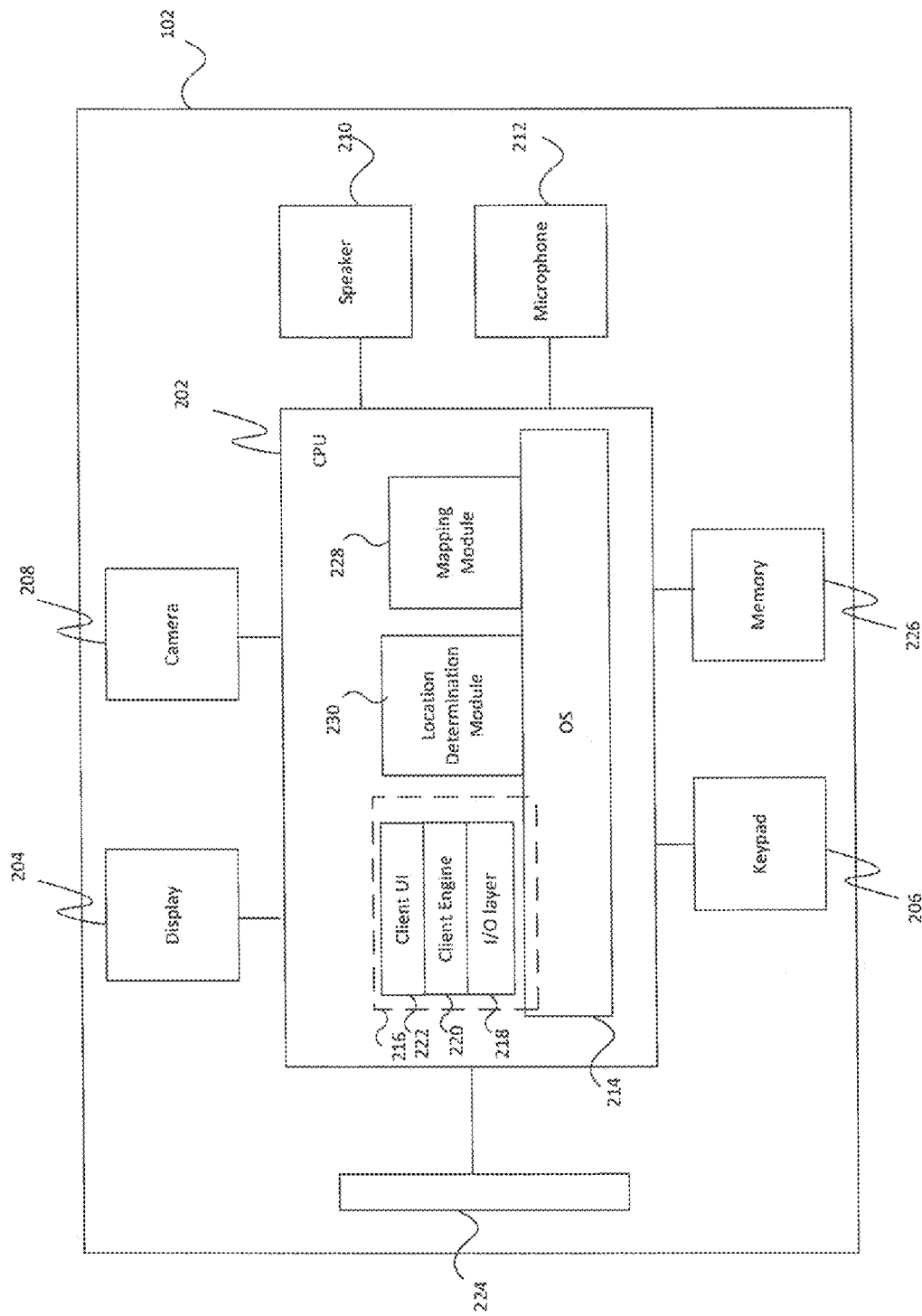
FIG. 2 shows a schematic view of a user terminal.

FIG. 2 illustrates a detailed view of the user terminal 102 on which is executed a communication client for communicating over the communication system 100. The user terminal 102 comprises a central processing unit ("CPU") 202, to which is connected a display 204 such as a screen or touch screen, input devices such as a keypad 206, a camera 208, and touch screen 204. An output audio device 210 (e.g. a speaker) and an input audio device 212 (e.g. a microphone) are connected to the CPU 202. The display 204, keypad 206, camera 208, output audio device 210 and input audio device 212 may be integrated into the user terminal 102 as shown in FIG. 2. In alternative user terminals one or more of the display 204, the keypad 206, the camera 208, the output audio device 210 and the input audio device 212 may not be integrated into the user terminal 102 and may be connected to the CPU 202 via respective interfaces. One example of such an interface is a USB interface. The CPU 202 is connected to a network interface 224 such as a modem for communication with the network 106. The network interface 224 may be integrated into the user terminal 102 as shown in FIG. 2. In alternative user terminals the network interface 224 is not integrated into the user terminal 102. The user terminal 102 also comprises a memory 226 for storing data as is known in the art. The memory 226 may be a permanent memory, such as ROM. The memory 226 may alternatively be a temporary memory, such as RAM.

FIG. 2 also illustrates an operating system ("OS") 214 executed on the CPU 202. Running on top of the OS 214 is a software stack 216 for the communication client application referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 10. The client engine layer 220 handles the connection management functions of the VoIP system as discussed above, such as establishing calls or other connections by server-based or P2P address look-up and authentication. The client engine may also be responsible for other secondary functions not discussed herein. The client engine layer 220 also communicates with the client user interface layer 222. The client engine layer 220 may be arranged to control the client user interface layer 222 to present information to the user of the user terminal 200 via the user interface of the client which is displayed on the display 204 and to receive information from the user the user terminal 200 via the user interface.

Also running on top of the OS 214 is a mapping module 228. The mapping module 228 provides a user interface which is displayed on display 204 for the first user 104 to interact with the mapping module 228. Once launched, the first user 104 may make an appropriate selection using the user interface provided by the mapping module 228 to display the geographical location of the first user 104. The mapping module 228 displays a map on the display 204 to display the geographical location of the first user 104. The mapping module 228 may support a plurality of zoom levels, such that the level of detail of the geographical location of the first user 104 can be increased or decreased by the first user 104. The mapping module 228 is configured to receive location information of the user terminal 102 from a location determination module 230 also running on top of the OS 214.

The location determination module 230 determines the location of the user terminal 102. The location determination module 230 uses geographic location technology for determining the location of the user terminal 102, in terms of geographic position relative to the surface of the earth; for example, a satellite based positioning system such as GPS (Global Positioning System, including potential variants such as assisted GPS or differential GPS), GLONASS (Global Navigation Satellite System) or Galileo; and/or trilateration (or more generally muiltilateration) relative to a plurality of different wireless base stations or access points having known locations; and/or a technique based on detecting signal strength relative to a known base station or access point. Other well-known methods may be used for the user terminal 102 to determine its location.

The mapping module 228 is also configured to receive location information of one or more other users of the communication system 100, as will be described in more detail below.

The user terminal 108 is implemented in the same way as user terminal 102 as described above, wherein the user terminal 108 may have corresponding elements to those described herein in relation to user terminal 102.

During a communication event (i.e. video call) between the first user terminal 102 and the second user terminal 108, the second user 110 at the second user terminal 108 may want to inform the first user 104 of the first user terminal 102 of his geographical location.

Reference is now made to FIG. 3, which shows a flow chart 300 of a method performed at the user terminal 102 whilst a video call is being conducted between the first user terminal 102 and the second user terminal 108.

During the video call between the first user terminal 102 and the second user terminal 108, at step S302 first user terminal 102 receives, via the network interface 224, encoded video data transmitted from the second user terminal 108 (frames of image data captured by the camera 208 of the second user terminal 108) over the network 106. The I/O layer 218 of the communication client application executed on the first user terminal 102 receives the incoming encoded video stream and decodes the encoded video stream. The client engine layer 220 controls the client user interface layer 222 to display the decoded video data to the first user 104 via the user interface of the client displayed on display 204.

During the video call between the first user terminal 102 and the second user terminal 108, the first user terminal may also receive, via the network interface 224, encoded audio data transmitted from the second user terminal 108 (captured by the microphone 212 of the second user terminal 108) over the network 106. The I/O layer 218 of the communication client application executed on the first user terminal 102 receives the incoming encoded audio data and decodes the encoded audio data for output to speaker 210.

The user interface of the communication client executed on the second user terminal 108 enables the second user 110 to select to send their geographic position to the first user terminal 102 over the network 106 during the video call. The second user 110 may make such a selection in the user interface of the communication client using an input device of the second user terminal 108. For example, the second user 110 may select a button displayed in the user interface of the communication client executed on the second user terminal 108 or navigate through appropriate menus of the user interface of the communication client in order to select to send their geographic position to the first user terminal 102.

Upon the second user 110 selecting to send their geographic position to participants in the video call (i.e. the first user terminal 102) during the video call. The communication client executed on the second user terminal 108 requests location information from the location determination module 230 on the second user terminal 108. Upon receiving this request, the location determination module 230 on the second user terminal 108 determines the location of the second user terminal 108 and supplies this location information to the communication client executed on the second user terminal 108.

The communication client executed on the second user terminal 108 transmits the location information to the first user terminal 102 over the network 106 and is received at the first user terminal 102 via the network interface 224 of the first user terminal 102. The location information may comprise a longitude and latitude of the second user terminal 108.

The location information may additionally comprise an altitude of the second user terminal 108.

In order to supply accurate location information to the first user terminal 102 the location determination module 230 on the second user terminal 108 may determine and supply location information to the communication client executed on the second user terminal 108 for transmission to the first user terminal 102 periodically. This enables, any change in location (i.e. movement) of the second user terminal 108 to be communicated to the first user terminal 102. Alternatively, after supplying location information to the communication client executed on the second user terminal 108, the location determination module 230 on the second user terminal 108 may only supply additional location information to the communication client executed on the second user terminal 108 for transmission to the first user terminal 102 if the location determination module 230 on the second user terminal 108 determines that the second user terminal 108 has moved.

The location information may be embedded into the video data transmitted from the second user terminal 108 to the first user terminal 102, such that the location information is sent on the same communication channel as the video data. Alternatively, the location information may be transmitted from the second user terminal 108 to the first user terminal 102 separately to the video data, such that the location information is sent on a different communication channel to the video data.

At step S304, the communication client executed on first user terminal 102 receives, via the network interface 224 of the first user terminal 102, the location information transmitted from the second user terminal 108 to the first user terminal 102 over the network 106.

At step S306, the communication client executed on the first user terminal 102 supplies the location information to the mapping module 228 on the first user terminal 102. The communication client executed on the first user terminal 102 and the mapping module 228 may each comprise an application programming interface (API) so that data may be exchanged between them to enable the applications to communicate with each other.

The mapping module 228 transmits the location information, with a request for map data via the network interface 224 to the mapping server 112. The mapping server 112 stores a large set of pre-generated map tile images covering the entire globe, each map tile has a z coordinate describing its zoom level and x and y co-ordinates describing its position. For each zoom level there is a predetermined number of map tile images to cover the entire globe, whereby the greater the zoom level, the greater the number of predetermined number of map tile images are required to cover the entire globe. A single map tile at a lower zoom level illustrates a larger geographic area than a single map tile at a higher zoom level.

The mapping server 112 determines, based on the received location information, a subset of map tile images of the large set of pre-generated map tile images stored by the mapping server 112. The mapping server 112 transmits the subset of map tile images to the mapping module 228 executed on the first user terminal 102.

The mapping module 228 supplies the subset of map tile images to the communication client application executed on the first user terminal 102. At step S306, the communication client application executed on the first user terminal 102 displays a map formed of the subset of map tile images on the display 204. The generated map provides a diagrammatic representation of an area of land or sea in the vicinity of the second user terminal 108 at an appropriate scale. For example, the generated map may show roads, parks, railway lines, rivers, hospitals, landmarks etc.

The mapping module 228 executed on the first user terminal 102 knows the location (i.e. a longitude and latitude) of the second user terminal 108 based on receiving this information from the communication client application. The subset of map tile images cover a range of longitudes and a range of latitudes of the vicinity of the second user terminal 108. Thus the mapping module 228 is able to determine the location of the second user terminal 108 with reference to the map formed of the subset of map tile images displayed on the display 204 (the mapping module 228 is able to determine a position of where to display a visual indication of the location of the second user terminal 108 with reference to the displayed map on the display 204).

The mapping module 228 executed on the first user terminal 102 communicates the position information relating to where to display a visual indication (with reference to the displayed map) of the location of the second user terminal 108 on the display 204, to the communication client application executed on the first user terminal 102.

At step S308, the communication client application executed on the first user terminal 102 uses this position information received from the mapping module 228 to control the video data received at step S302 to be displayed in a position of the display 204 to provide a visual indication of the location of the second user terminal 108 with reference to the displayed map. That is, by its very nature the map displayed by the mapping module 228 displays a plurality of geographical locations, and the communication client application executed on the first user terminal 102 controls the video data received from the second user terminal 108 to be displayed on the display 204 to provide a visual indication of the location of the second user terminal 108 at one of the plurality of locations.

Thus both geographical location information and video data are simultaneously displayed on a user terminal to visually indicate the location of the second user terminal 108 from which the video data is received.

It will be appreciated from the above, that embodiments of the disclosure lets all participants in a video call keep eye-contact and continue visual communication whilst at the same time clearly communicating each other's geographic location and movements. In embodiments of the disclosure switching between user interfaces of different applications to view both geographical location information and video data is avoided.

The simultaneous display of both geographical location information and video data may be implemented in a number of ways.

Figure 4B:
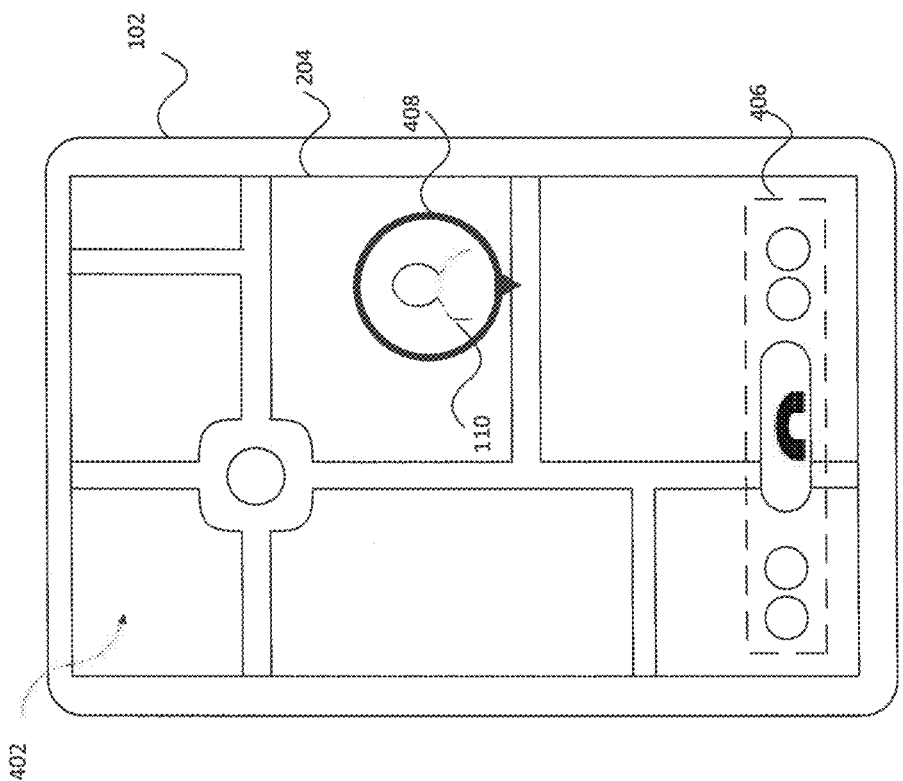
FIGS. 4a and 4b show how received video data may be displayed to provide a visual indication of the location of one or more participants of a video call.
Figure 4A:
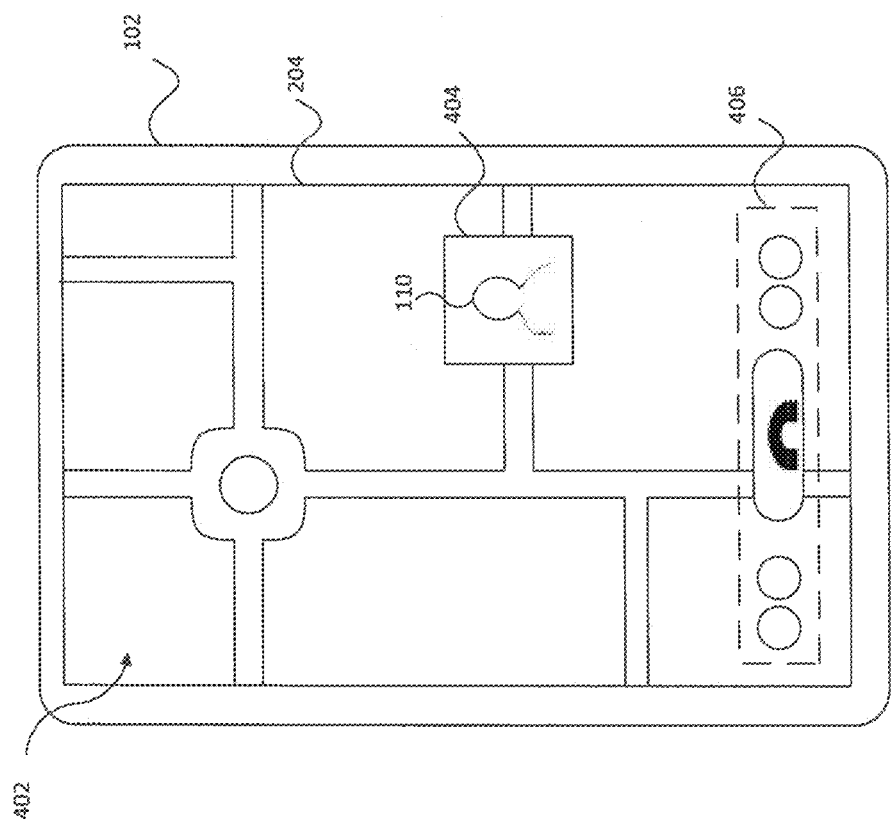

Reference is now made to FIGS. 4a and 4b which illustrate how received video data may be displayed to provide a visual indication of the location of a participant of a video call.

On the display 204 of the first user terminal 102 a map 402 is displayed by the communication client application executed on the first user terminal 102, the map formed of the subset of map tile images received from the mapping module 228. The communication client application executed on the first user terminal 102 also displays a "video avatar" (captured video data of the second user 110) on the displayed map 402.

In FIG. 4a the video avatar is shown in a window 404 which displays the video data received from the second user terminal 108 at step S302. That is, window 404 displays the real-time video data captured at the second user terminal 108 and transmitted to the first user terminal 102 over the network 106, for example video data of the second user 110. Alternatively, as shown in FIG. 4b, the video avatar may be shown enclosed within a border 408, the border 408 comprising a pointer to provide a more accurate indication of the location of the second user terminal 108.

Whilst FIGS. 4a and 4b show the video avatar being rendered by the communication client application such that it overlays (i.e. is on top of) the displayed map 402. In other embodiments, a portion of, or the entire video avatar may not be displayed on top of the displayed map. For example, the map 402 may be displayed in the centre of the display 204 and the video avatar may be displayed outside the edge of the map 402 and a suitable marker or pointer may be displayed to indicate the location of the second user terminal 108 on the displayed map 402.

As shown in FIGS. 4a and 4b, the communication client application executed on the first user terminal 102 may overlay selectable buttons 406 for the first user 104 to select using an appropriate input device. The selectable buttons 406 may comprise a button to end the video call, to mute audio such that no audio data received during the video is output from the speaker 210, to control the volume of audio output from the speaker 210, and other functionality related to the video call. By overlaying the selectable buttons 406 on top of the displayed map 402, the size of the map 402 is maximised which is advantageous on mobile devices with limited display size. Alternatively a portion of or all of the selectable buttons 406 may not be displayed on top of the displayed map. For example, the selectable buttons 406 may be displayed outside the edge of the map 402.

The video data displayed by the communication client application on the display 204 may be a selectable input. That is, the first user 104 may select the displayed video data using an appropriate input device of the first user terminal 102.

In response to the first user 104 selecting the displayed video data the communication client application may display a map formed of map tile images with a higher zoom level than the zoom level of the map tile images displayed prior to the user selection by the first user 104 i.e. the communication client application executed on the first user terminal 102 zooms in on the location of the second user terminal 108. That is, in response to the communication client application detecting selection of the displayed video data, the communication client application may transmit a request to the mapping module 228 for map data based on the latest location information received at the first user terminal 102 at a higher zoom level. The mapping module 228 retrieves this map data from the map server 112 and supplies it to the communication client application for display on the display 204.

This enables the first user 104 to be provided with a more detailed view of the location of the second user terminal 108 to assist in determining the location of the second user terminal 108.

In response to the first user 104 selecting the video data displayed the communication client application may increase the size of the displayed video data. That is, in response to the communication client application detecting selection of the displayed video data, the communication client application may utilise a larger physical portion of the display 204 to display the received video data i.e. the communication client application executed on the first user terminal 102 zooms in on the displayed video data. This enables the first user 104 to be provided with a larger view of the received video data.

In response to communication client application detecting selection of the displayed video data, the communication client application may provide the user one or more selectable options pertaining to the functionality provided by the communication client application. The one or more selectable options may be selected by the first user 104 using an appropriate input device on the first user terminal 102 and allow interaction with the second user 110 at the second user terminal 108.

The one or more selectable options may include an option to view profile information of the second user 110, to send the second user 110 a Short Message Service (SMS) message, to send the second user 110 an IM message, to send the second user 110 a data file, to view IM conversation history between the first user 104 and the second user 110 etc. It will be appreciated that these examples are used herein to illustrate the concept and further selectable options may be provided the communication client application that are not described herein.

During the video call, as updates to the location of the second user terminal 108 are sent to the first user terminal, the communication client application executed on the first user terminal 102 controls the video data received from the second user terminal 108 to be displayed on said display to provide a visual indication of the location of the second user terminal 108 with reference to the displayed map. That is, a video avatar of the second user will move on the map as the second user terminal moves geographical position.

In order for the first user terminal 102 to operate in accordance with the process of FIG. 3 to display both geographical location information and video data on the first user terminal 102 to visually indicate the location of the second user terminal 108, it will be appreciated that the location determination module 228 on the first user terminal 102 is not required.

Whilst it has been described above that location information is sent in one direction (from the second user terminal 108 to the first user terminal 104), during the video call the first user 104 may select to share their geographical location with the second user 110. That is, location information may be transmitted from and received at, at a single user terminal during a video call. It will be appreciated that in order for the first user terminal 102 to share their geographical location the location determination module 228 is required in order to determine the location of the user terminal 102.

Whilst only two user terminals have been shown in FIG. 1 for simplicity, it will be appreciated that a video call maybe conducted between more than two users using respective user terminals. During the video call, regardless of the number of participants in the call, one or more call participants can broadcast their location at the same time, and their video avatars can be rendered on the map of the other devices. When a user terminal receives location information from a plurality of user terminals, the scale of the map displayed at step S306 will depend on the geographical proximity of the plurality of user terminals. For example the map tile images forming the map when the plurality of user terminals are located in the same city will be at a higher zoom level, than the map tile images forming the map when the plurality of user terminals are located in different cities.

Whilst the map data stored by the mapping server 112 has been described above as comprising pre-generated map tile images, the map data stored by the mapping server 112 may take other forms well known to persons skilled in the art.

The steps shown separately in FIG. 3 may or may not be implemented as separate steps.

Generally, any of the functions described herein can be implemented using software, firmware, hardware (e.g., fixed logic circuitry), or a combination of these implementations. The terms "module," "functionality," "component", "application" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user terminal comprising:
a network interface;
a display; and
a communications module configured to:
receive video data from at least one further user terminal over a communications network during a communication event with said at least one further user terminal via said network interface;
receive location information from said at least one further user terminal over the communications network via said network interface;
in response to receiving said location information, display a map on said display, said map displaying a plurality of locations; and
for each of said at least one further user terminal, control the video data received from said further user terminal to be displayed on said display to provide a visual indication of the location of said further user terminal at one of said plurality of locations, and control the display of the video data received from said further user terminal to overlay the displayed map.

2. The user terminal according to claim 1, wherein the user terminal further comprises a mapping module, the mapping module configured to:
receive said location information from the communications module;
transmit said location information to a map server coupled to said communications network, via said network interface;
receive map data from said map server via said network interface; and
supply said map data to said communications module.

3. The user terminal according to claim 2, wherein the communications module is configured to display said map using said map data received from the mapping module.

4. The user terminal according to claim 2, wherein the map data comprises a plurality of map tile images.

5. The user terminal according to claim 2, wherein the communications module is configured to control the video data received from said further user terminal to be displayed on said display based on receiving position information from said mapping module.

6. The user terminal according to claim 2, wherein the communications module and the mapping module communicate using respective application programming interfaces.

7. The user terminal according to claim 1, wherein the location information and video data are received from at least one further user terminal over a single communication channel over the communications network.

8. The user terminal according to claim 1, wherein the location information and video data are received from at least one further user terminal over separate communication channels over the communications network.

9. The user terminal according to claim 1, wherein the communications module is configured to control the video data received from said further user terminal to be displayed on said display within a border, said border comprising a pointer to provide a visual indication of the location of said further user terminal at one of said plurality of locations.

10. The user terminal according to claim 1, wherein the communications module is configured to control the video data received from said further user terminal to be displayed as a selectable input.

11. The user terminal according to claim 10, wherein the communications module is configured to detect selection of the displayed video data and in response to said detection, display said map at an increased zoom level.

12. The user terminal according to claim 10, wherein the communications module is configured to detect selection of the displayed video data and in response to said detection, increase the size of the displayed video data.

13. The user terminal according to claim 10, wherein the communications module is configured to detect selection of the displayed video data and in response to said detection, display one or more selectable options for interaction with said at least one further user terminal.

14. The user terminal according to claim 13, wherein the one or more selectable options comprise at least one of:
an option to view profile information of a user associated with the at least one further user terminal;
an option to send the user associated with the at least one further user terminal a Short Message Service message;
an option to send the user associated with the at least one further user terminal an instant message;
an option to send the user associated with the at least one further user terminal a data file; and
an option to view an instant message conversation history between a user associated with the user terminal and the at least one further user terminal.

15. The user terminal according to claim 1, wherein the location information comprises latitude and longitude information.

16. The user terminal according to claim 15, wherein the location information comprises altitude information.

17. The user terminal according to claim 1, wherein the communication event is a video call.

18. A system comprising:
one or more processors; and
one or more computer-readable media configured so as when executed by the one or more processors of a user terminal comprising a display and network interface perform operations comprising:
receiving video data from at least one further user terminal over a communications network during a communication event with said at least one further user terminal via said network interface;
receiving location information from said at least one further user terminal over the communications network via said network interface;
and in response to receiving said location information, displaying a map on said display, said map displaying a plurality of locations, and for each of said at least one further user terminal, control the video data received from said further user terminal to be displayed on said display to provide a visual indication of the location of said further user terminal at one of said plurality of locations, and control the display of the video data received from said further user terminal to overlay the displayed map.

19. A method implemented at a user terminal, the method comprising:
receiving video data from at least one further user terminal over a communications network during a video call with said at least one further user terminal via a network interface of said user terminal;
receiving latitude and longitude information from said at least one further user terminal over the communications network via said network interface;
and in response to receiving said latitude and longitude information, displaying a map on a display of said user terminal said map displaying a plurality of locations, and for each of said at least one further user terminal, controlling the video data received from said further user terminal to be displayed on said display to provide a visual indication of the location of said further user terminal at one of said plurality of locations, and control the display of the video data received from said further user terminal to overlay the displayed map.

* * * * *